(12) United States Patent  
Chang et al.

(10) Patent No.: US 9,207,330 B2
(45) Date of Patent: Dec. 8, 2015

(54) POSITIONING DEVICE AND POSITIONING METHOD THEREOF (75) Inventors: Fan-Ren Chang, Taipei (TW);
He-Sheng Wang, Keelung (TW);
Hung-Wei Chen, Taichung (TW);
Chih-Horng Li, New Taipei (TW);
Shu-Min Chuang, Taipei (TW);
Ping-Feng Wang, Miaoli County (TW);
Chih-Min Hsu, Yilan (TW); Shan-Yuan Yang, New Taipei (TW)

(73) Assignee: Institute For Information Industry, Taipei (TW)

( * ) Notice: Subject to any disclaimer, the term of this patent is extended or adjusted under 35 U.S.C. 154(b) by 892 days.

(21) Appl. No.: 13/343,237

(22) Filed: Jan. 4, 2012

(65) Prior Publication Data

US 2012/0293364 A1 Nov. 22, 2012

(30) Foreign Application Priority Data

May 18, 2011 (TW) .............................. 100117380 A (51) Int. Cl.
*G01S 19/40* (2010.01)
(52) U.S. Cl.
CPC ...................... *G01S 19/40* (2013.01)
(58) Field of Classification Search
CPC .................................................... G01S 19/40
See application file for complete search history.

(56) References Cited

U.S. PATENT DOCUMENTS

| 2003/0112177 | A1 | 6/2003 | Toda et al. | |
| 2008/0180315 | A1* | 7/2008 | Tarlow et al. | 342/357.01 |
| 2009/0102708 | A1* | 4/2009 | Dai et al. | 342/357.03 |
| 2009/0295630 | A1 | 12/2009 | Wengler et al. | |
| 2010/0045516 | A1* | 2/2010 | Nagahara | 342/357.03 |
| 2010/0164788 | A1 | 7/2010 | Ghaida | |

FOREIGN PATENT DOCUMENTS

| CN | 101606080 | 12/2009 |
| JP | 2000-131088 | 5/2000 |
| JP | 2002-122654 A | 4/2002 |
| TW | 200844469 | 11/2008 |

OTHER PUBLICATIONS

Search Report and Written Opinion issued in Dutch Patent Application No. NL2008101 mailed Aug. 28, 2012.

* cited by examiner

*Primary Examiner* — Cassie Galt
(74) *Attorney, Agent, or Firm* — Skaar Ulbrich Macari, P.A.

(57) ABSTRACT

A positioning device and a positioning method thereof are provided. The positioning device can cooperate with a first satellite group and a second satellite group, and it comprises a storage, a receiver and a processor. The receiver is configured to receive a first satellite group signal from the first satellite group and a second satellite group signal from the second satellite group. The processor is electrically connected to the storage and the receiver, and configured to calculate a positioning offset value according to one of the first satellite group signal and the second satellite group signal. In addition, the processor is configured to calculate a positioning result according to the second satellite group signal and the positioning offset, and store the positioning result in the storage.

6 Claims, 4 Drawing Sheets

POSITIONING DEVICE AND POSITIONING METHOD THEREOF

This application claims priority to Taiwan Patent Application No. 100117380 filed on May 18, 2011, which is hereby incorporated by reference in its entirety.

FIELD

The present invention relates to a positioning device and a positioning method thereof; more particularly, the present invention relates to a positioning device and a positioning method thereof that can solve the problem of instantaneous positioning coordinate shift caused by a change in the satellite amount.

BACKGROUND

Nowadays, applications of navigating technologies have gradually extended from purely the professional military aviation and voyage applications to commercialized applications. This is primarily attributed to rapid development of the Global Positioning System (GPS). In recent years, GPS has been widely applied in vehicles and personal navigation systems; and especially, among various consumer electronic products, personal navigation devices (PNDs) have become daily necessities in general people's life. In other words, commercialized satellite positioning applications have been now widely accepted by the general people.

Generally speaking, the positioning deviation of current GPS devices is within about 10 meters. Because such a positioning deviation is inadequate in urban areas with dense road networks, most PNDs are equipped with an electronic map so that, in conjunction with an appropriate algorithm, a road where the user is located can be properly determined. For example, a car driving in an urban area mostly drives along a same road, and it is impossible for the car to instantaneously jump to another road 10 meters apart in reasonable cases.

Therefore, even when a deviation (i.e., an absolute deviation) at the outset of the positioning is as large as 10 meters, the user can still be positioned to be on the same road through use of the electronic map and the appropriate algorithm as long as the deviation (i.e., the relative deviation) is kept at an initial level instead of varying suddenly. However, if the relative deviation varies suddenly, it will be possible that the positioning coordinates obtained at a previous time point and those obtained at a next time point are discontinuous or vary greatly from each other even if the absolute deviation becomes smaller; consequently, this will cause an instantaneous shift in the positioning coordinates. Accordingly, the relative deviation is an important indicator for navigating technologies.

Inevitably, a change in the amount of GPS positioning satellites (or a change in geometry of the GPS positioning satellites) tends to cause an instantaneous positioning coordinate shift. In order to overcome the aforesaid problem, the conventional GPS positioning technology adopts a differential correction algorithm to improve the positioning accuracy of GPS and, together, reduce variations in the accuracy (i.e., reduce the relative deviation in positioning). However, for common commercial GPS devices (e.g., PNDs), they are unable to receive differential correction signals.

Additionally, GPS positioning devices capable of receiving differential correction signals are mostly devices for measurement purpose. These GPS positioning devices not only are relatively expensive, but also typically have to be equipped with other data links in order to receive the differential correction signals; for example, they have to work with the Global System for Mobile Communications (GSM), Wireless Fidelity (Wi-Fi) or the Third Generation Mobile Communications. Further even for a GPS positioning device capable of receiving differential correction signals, the problem of instantaneous positioning coordinate shift may also be caused when a differential correction signal from one of the satellites disappears suddenly. For these reasons, the differential correction algorithm fails to be widely applied in the current GPS positioning devices.

Specifically, to eliminate the instantaneous positioning coordinate shift caused by a change in the satellite amount, the conventional GPS positioning technology has to calculate positioning solutions of satellite configurations before and after a change occurs in the satellite amount; only in this way can the positioning offset caused by the change in the satellite amount be derived so as to eliminate the positioning deviation. Furthermore, for the conventional GPS positioning technology, it takes a long time to calculate necessary positioning coordinates, which indirectly makes it inconvenient for the user to obtain the positioning coordinates.

In view of this, an urgent need exists in the art to reduce the relative deviation by more effectively eliminating instantaneous shift of positioning coordinates received by GPS devices that is caused by an instantaneous change in the satellite amount.

SUMMARY

An objective of the present invention is to provide a positioning device and a positioning method thereof, so as to effectively solve the problem of instantaneous positioning coordinate shift of conventional GPS devices caused by a change in the satellite amount.

To achieve the aforesaid objective, the present invention provides a positioning device. The positioning device is capable of cooperating with a first satellite group and a second satellite group, and a satellite amount of the first satellite group is smaller than a satellite amount of the second satellite group. The positioning device comprises a storage, a receiver and a processor. The receiver is configured to receive a first satellite group signal from the first satellite group and a second satellite group signal from the second satellite group. The processor, which is electrically connected to the storage and the receiver, is configured to calculate a positioning offset value according to the second satellite group signal, to calculate a positioning result according to the second satellite group signal and the positioning offset value, and to store the positioning result in the storage.

To achieve the aforesaid objective, the present invention provides another positioning device. The positioning device is capable of cooperating with a first satellite group and a second satellite group, and a satellite amount of the first satellite group is larger than a satellite amount of the second satellite group. The positioning device comprises a storage, a receiver and a processor. The receiver is configured to receive a first satellite group signal from the first satellite group and a second satellite group signal from the second satellite group. The processor, which is electrically connected to the storage and the receiver, is configured to calculate a positioning offset value according to the first satellite group signal, to calculate a positioning result according to the second satellite group signal and the positioning offset value, and to store the positioning result in the storage.

To achieve the aforesaid objective, the present invention further provides a positioning method for use in a positioning device. The positioning device is capable of cooperating with a first satellite group and a second satellite group, and a satellite amount of the first satellite group is smaller than a satellite amount of the second satellite group. The positioning device comprises a storage, a receiver, and a processor electrically connected to the storage and the receiver. The positioning method comprises the steps of:

(a) enabling the receiver to receive a first satellite group signal from the first satellite group;

(b) enabling the receiver to receive a second satellite group signal from the second satellite group;

(c) enabling the processor to calculate a positioning offset value according to the second satellite group signal;

(d) enabling the processor to calculate a positioning result according to the second satellite group signal and the positioning offset value; and (e) enabling the processor to store the positioning result in the storage.

To achieve the aforesaid objective, the present invention further provides another positioning method for use in a positioning device. The positioning device is capable of cooperating with a first satellite group and a second satellite group, and a satellite amount of the first satellite group is larger than a satellite amount of the second satellite group. The positioning device comprises a storage, a receiver, and a processor electrically connected to the storage and the receiver. The positioning method comprises the steps of:

(a) enabling the receiver to receive a first satellite group signal from the first satellite group;

(b) enabling the receiver to receive a second satellite group signal from the second satellite group;

(c) enabling the processor to calculate a positioning offset value according to the first satellite group signal;

(d) enabling the processor to calculate a positioning result according to the second satellite group signal and the positioning offset value; and (e) enabling the processor to store the positioning result in the storage.

As can be known from the above descriptions, in response to a satellite amount of a first satellite group and a satellite amount of a second satellite group, the positioning device and the positioning method thereof of the present invention calculate a positioning offset value according to one of a first satellite group signal and a second satellite group signal, and then calculate a positioning result according to the second satellite group signal and the positioning offset value.

In particular, because the first satellite group signal and the second satellite group signal are just positioning signals received by general GPS devices in normal operations, it is unnecessary for the positioning device and the positioning method thereof of the present invention to calculate positioning solutions of satellite configurations before and after a change occurs in the satellite amount; instead, the positioning offset value can be calculated simply according to the known positioning signals. Accordingly, the positioning device and the positioning method thereof of the present invention can effectively solve the problem of instantaneous positioning coordinate shift of conventional GPS devices caused by a change in the satellite amount.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the positioning device and the positioning method thereof of the present invention will be explained with reference to embodiments thereof. It should be appreciated that, in the following embodiments and the attached drawings, elements and steps unrelated to the present invention are omitted from depiction; and in order to disclose the technical features of the present invention more clearly, the drawings of the present invention are all drawn in a practical and more obvious way. This is intended to facilitate description of the present invention but not to limit the present invention; rather, the scope of the present invention is defined by the claims.

Figure 1:
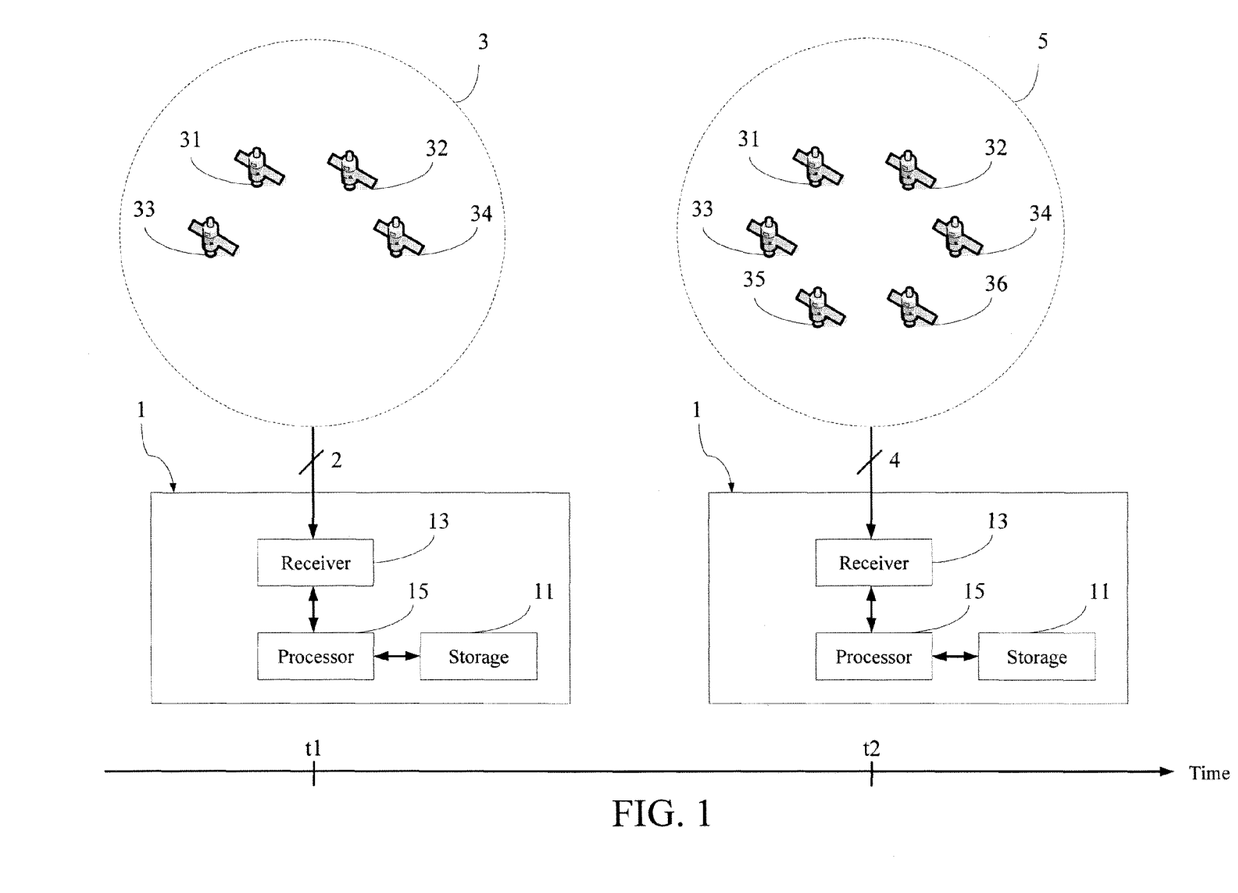
FIG. 1 is a schematic view illustrating operations of a positioning device 1 according to a first embodiment of the present invention.

A first embodiment of the present invention is a positioning device 1. FIG. 1 is a schematic view illustrating operations of the positioning device 1. The positioning device 1 is capable of cooperating with a first satellite group 3 and a second satellite group 5, and a satellite amount of the first satellite group 3 is smaller than a satellite amount of the second satellite group 5. The first satellite group 3 comprises a satellite 31, a satellite 32, a satellite 33 and a satellite 34, and the second satellite group 5 comprises a satellite 31, a satellite 32, a satellite 33, a satellite 34, a satellite 35 and a satellite 36. It shall be appreciated that, the satellite amount of the first satellite group 3 and that of the second satellite group 5 described herein are only illustrated as an example of the present invention and shall not be regarded as a limitation thereto.

The positioning device 1 may be a mobile phone, a notebook computer, an on-board navigator, or some other apparatus with GPS navigating functionality; that is, all devices with the GPS navigating functionality are covered in the scope of the present invention. The positioning device 1 comprises a storage 11, a receiver 13 and a processor 15. The receiver 13 receives a first satellite group signal 2 from the first satellite group 3 at a first time point t1, and receives a second satellite group signal 4 from the second satellite group 5 at a second time point t2. The processor 15, which is electrically connected to the storage 11 and the receiver 13, is configured to calculate a positioning offset value according to the second satellite group signal 4, to calculate a positioning result according to the second satellite group signal 4 and the positioning offset value, and to store the positioning result in the storage 11.

In more detail, as the satellite amount changes from 4 to 6 (i.e., from the first satellite group 3 to the second satellite group 5), an instantaneous shift of the positioning coordinates of the positioning device 1 occurs to result in a positioning offset value. The processor 15 derives a positioning offset relationship between the first satellite group signal 2 and the second satellite group signal 4 according to a Least-Squares algorithm, and calculates the positioning offset value according to the positioning offset relationship and the second satellite group signal 4. Thereafter, the processor 15 calculates a positioning result according to the second satellite group signal 4 and the positioning offset value, and stores the positioning result in the storage. At this point, the positioning result is positioning coordinates in which the instantaneous positioning coordinate shift caused by a change in the satellite amount has been eliminated.

It shall be appreciated that, the preferred satellite amount necessary for GPS positioning is generally four or above, and three-dimensional positioning coordinates (i.e., x-y-z coordinates) and a clock error can be calculated by use of four satellites.

Next, how a positioning offset relationship between the first satellite group 3 and the second satellite group 5 is derived will be described. Firstly, as set forth in documents related to the Least-Squares algorithm, a relationship between a new estimation result and an old estimation result can be derived when the amount of unknown numbers increases. Accordingly, assuming that the amount of unknown numbers to be estimated increases from p to q, a positioning result of the second satellite group 5 can be represented as the Equation (1):

$$Y = \begin{bmatrix} y(1) \\ y(2) \end{bmatrix} = HX = [H_1 \mid H_2]\begin{bmatrix} x(1) \\ x(2) \end{bmatrix} \quad (1)$$

where, Y represents a distance matrix between the second satellite group 5 and the positioning device 1, X represents a positioning result matrix of the second satellite group 5, H represents a channel matrix of the second satellite group 5, and X and H may be represented as Equation (2) and Equation (3) respectively:

$$X = [x_1 \; x_2 \; \ldots \; x_p \mid x_{p+1} \; \ldots \; x_q]^T = [x(1) \; x(2)]^T \quad (2)$$

$$H = \begin{bmatrix} h_1(1) & h_2(1) & \ldots & h_p(1) & h_{p+1}(1) & \ldots & h_q(1) \\ h_1(2) & h_2(2) & \ldots & h_p(2) & h_{p+1}(2) & \ldots & h_q(2) \\ \vdots & \vdots & \vdots & \vdots & \vdots & \vdots & \vdots \\ h_1(m) & h_2(m) & \ldots & h_p(m) & h_{p+1}(m) & \ldots & h_q(m) \end{bmatrix} \quad (3)$$

where, m represents the satellite amount of the second satellite group 5.

In order to derive the positioning result matrix X, Equation (1) may be further represented as Equation (4) through an inverse matrix operation:

$$\begin{bmatrix} H_1^T y(1) \\ H_1^T y(2) \end{bmatrix} = \begin{bmatrix} H_1^T H_1 & H_1^T H_2 \\ H_2^T H_1 & H_2^T H_2 \end{bmatrix}\begin{bmatrix} x(1) \\ x(2) \end{bmatrix} \quad (4)$$

Next, the following Equation (5) can be derived according to the Least-Squares algorithm:

$$H_1^T y(1) = H_1^T H_1 \hat{x}(1) + H_1^T H_2 \hat{x}(2)$$

$$H_1^T y(2) = H_2^T H_1 \hat{x}(1) + H_2^T H_2 \hat{x}(2) \quad (5)$$

Further, the following Equation (6) can be derived from Equation (5):

$$\hat{x}(1) = \hat{\hat{x}}(1) - A H_2^T (y(1) - H_1 \hat{\hat{x}}(1))$$

$$A = (H_1^T H_1)^{-1} H_1^T H_2 B$$

$$B = [H_2^T H_2 - H_2^T H_1 (H_1^T H_1)^{-1} H_1^T H_2]^{-1}$$

$$\hat{\hat{x}}(1) = (H_1^T H_1)^{-1} H_1^T y(1) \quad (6)$$

where, $\hat{x}(1)$ represents an old estimated positioning result matrix of the first satellite group 3, $\hat{\hat{x}}(1)$ represents an new estimated positioning result matrix of the second satellite group 5.

The value of Y in Equation (1) can be estimated according to the light speed ($3 \times 10^8$ m/s) and a time taken to transmit a signal from the second satellite group 5 to the positioning device 1. For example, if the time taken to transmit a signal from the satellite 31 to the positioning device 1 is 10 seconds, the distance between the satellite 31 and the positioning device 1 may be estimated to be $3 \times 10^9$ m. However, this estimated value may vary slightly with parameters such as the atmospheric pressure, the temperature and the humidity. Therefore, Equation (1) can be solved in general GPS positioning processes.

Hereinbelow, a relationship between H1 and H2 in Equation (6) will be further described. In detail, given that Equation (1) can be solved, Equation (1) may be further represented as the following Equation (7) when the amount of unknown numbers is 4:

$$\Delta X_{4 \times 1} = (H_{m \times 4}^T H_{m \times 4})^{-1} H_{m \times 4}^T \Delta Y_{4 \times 1} \quad (7)$$

where, $\Delta X_{4 \times 1}$ represents a positioning result matrix that is derived, $\Delta Y_{4 \times 1}$ represents a distance matrix estimated from a satellite group to the positioning device, $H_{m \times 4}$ represents a channel matrix of the satellite group, and m represents a satellite amount of the satellite group. Assume that the amount of unknown numbers increases to 5, we can find that when a fifth element in the fifth row of a channel matrix $H_{m \times 5}$ of the satellite group is 1 and other elements are 0, the positioning result matrix $\Delta X_{5 \times 1}$ obtained will be identical to a positioning result matrix $\Delta X_{5 \times 1}$ obtained by removing the fifth row of $H_{m \times 5}$, and the first four elements of $\Delta X_{5 \times 1}$ will be identical to $\Delta X_{4 \times 1}$. Taking m=5 as an example, when the first element in the fifth row of $H_{m \times 5}$ is 1 and other elements are 0, $H_{m \times 5}$ may be represented as the following Equation (8):

$$H_{5 \times 5} = \begin{bmatrix} h_1(1) & h_2(1) & h_3(1) & h_4(1) & 0 \\ h_1(2) & h_2(2) & h_3(2) & h_4(2) & 0 \\ h_1(3) & h_2(3) & h_3(3) & h_4(3) & 0 \\ h_1(4) & h_2(4) & h_3(4) & h_4(4) & 0 \\ h_1(5) & h_2(5) & h_3(5) & h_4(5) & 1 \end{bmatrix} \quad (8)$$

When the satellite amount decreases from five to four (or increases from four to five), the positioning result $\Delta X_{4 \times 1}$ of the four satellites can be calculated according to a channel matrix $H_{5 \times 5}$ of the five satellites. If an element in an $i^{th}$ column and the fifth row of the channel matrix $H_{5 \times 5}$ has a value of 1, it indicates that the $i^{th}$ satellite is lost. For example, i=2 indicates that the satellite that is lost is the second satellite, i=5 indicates that the satellite that is lost is the fifth satellite, and so on. Similarly, cases where the satellite amount changes by two or more at one time will also be readily appreciated based on the above descriptions. That is, when a change occurs in the satellite amount, the positioning result of the satellite group having fewer satellites can be derived from the channel matrix of the satellite group having more satellites, so no further description will be made herein.

From the conclusions and derivations described above and with reference to Equation (6), it can be known that H1 represents a channel matrix $H_{m \times 4}$ of a plurality of satellites, H2 represents another channel matrix $H_{m \times n}$ of the plurality of satellites. Here, m represents the satellite amount of the plurality of satellites, and n represents a change in the satellite amount. Thus, the positioning offset caused by the change in the satellite amount may be represented as the following Equation (9):

$$\delta_x = \hat{\hat{x}}(1) - \hat{x}(1) = AH_2^T(y(1) - H_1\hat{x}(1))$$

$$A = (H_1^T H_1)^{-1} H_1^T H_2 B$$

$$B = [H_2^T H_2 - H_2^T H_1 (H_1^T H_1)^{-1} H_1^T H_2]^{-1}$$

$$\hat{x}(1) = H_1^T H_1)^{-1} H_1^T y(1) \tag{9}$$

where, $\hat{x}(1)$ represents an estimated positioning result matrix of the first satellite group 3, $\hat{\hat{x}}(1)$ represents an estimated position result matrix of the second satellite group 5. Thus, a relationship between the positioning result of the first satellite group 3 and the positioning result of the second satellite group 5 can be obtained from Equation (9).

In terms of the physical meaning, Equation (9) represents that, when there is a change in the satellite amount, a new positioning result (i.e., $\hat{\hat{x}}(1)$) is equal to the old positioning result (i.e., $\hat{x}(1)$) minus residual values of some satellites (i.e., $y(1) - H_1\hat{x}(1)$) multiplied by a relational matrix (i.e., $AH_2^T$), and the so-called positioning offset value (i.e., $\delta_x$) is a value obtained by multiplying the residual values of some satellites with a relational matrix (i.e., $AH_2^T(y(1) - H_1\hat{x}(1))$).

Assume that a set of visible satellite serial numbers at a time point t1 is P, a set of visible satellite serial numbers at a time point t2 is Q, and a set of columns in the channel matrix $H_Q$ that correspond to the newly added satellites at the time point t2 is G. Then, the positioning offset value of the positioning device 1 caused by the increased satellite amount may be rewritten as the following general expression:

$$\delta_x = AH_2^T(\Delta\rho_Q - H_1 \Delta x_Q)$$

$$A = (H_1^T H_1)^{-1} H_1^T H_2 B$$

$$B = [H_2^T H_2 - H_2^T H_1 (H_1^T H_1)^{-1} H_1^T H_2]^{-1} \tag{10}$$

where, $\Delta x_Q$ represents a positioning result of the second satellite group 5, $H_1$ represents a channel matrix $H_{Q \times 4}$ of the second satellite group 5, and $H_2$ represents other channel matrix $H_{Q \times (Q-P)}$ of the second satellite group 5. Here, in $H_{Q \times (Q-P)}$, the $G\{i\}^{th}$ element in the $i^{th}$ row has a value of 1 and other elements all have a value of 0.

It shall be appreciated that, because the positioning offset value of the positioning device 1 caused by the increased satellite amount will not disappear as the satellite amount returns to the original value, the processor 17 of the positioning device 1 further diminishes the positioning offset value according to a parameter k. This may be represented as the following Equation (11):

$$\Sigma\delta_x = \delta_x + k\Sigma\delta_{x_{old}} \tag{11}$$

where, the parameter k represents a weight, and the positioning offset value may be diminished with time depending on different weight values.

With the arrangement and operations of the first embodiment, the positioning device 1 of the present invention can calculate a positioning offset value simply according to the second satellite group signal 4 when the satellite amount increases, and the positioning offset value diminishes with time depending on the parameter k; further, the second satellite group signal 4 and the positioning offset value can be used to derive a positioning result, which is just the coordinates of the positioning device 1 in which the satellite offset value has been canceled.

Figure 2:
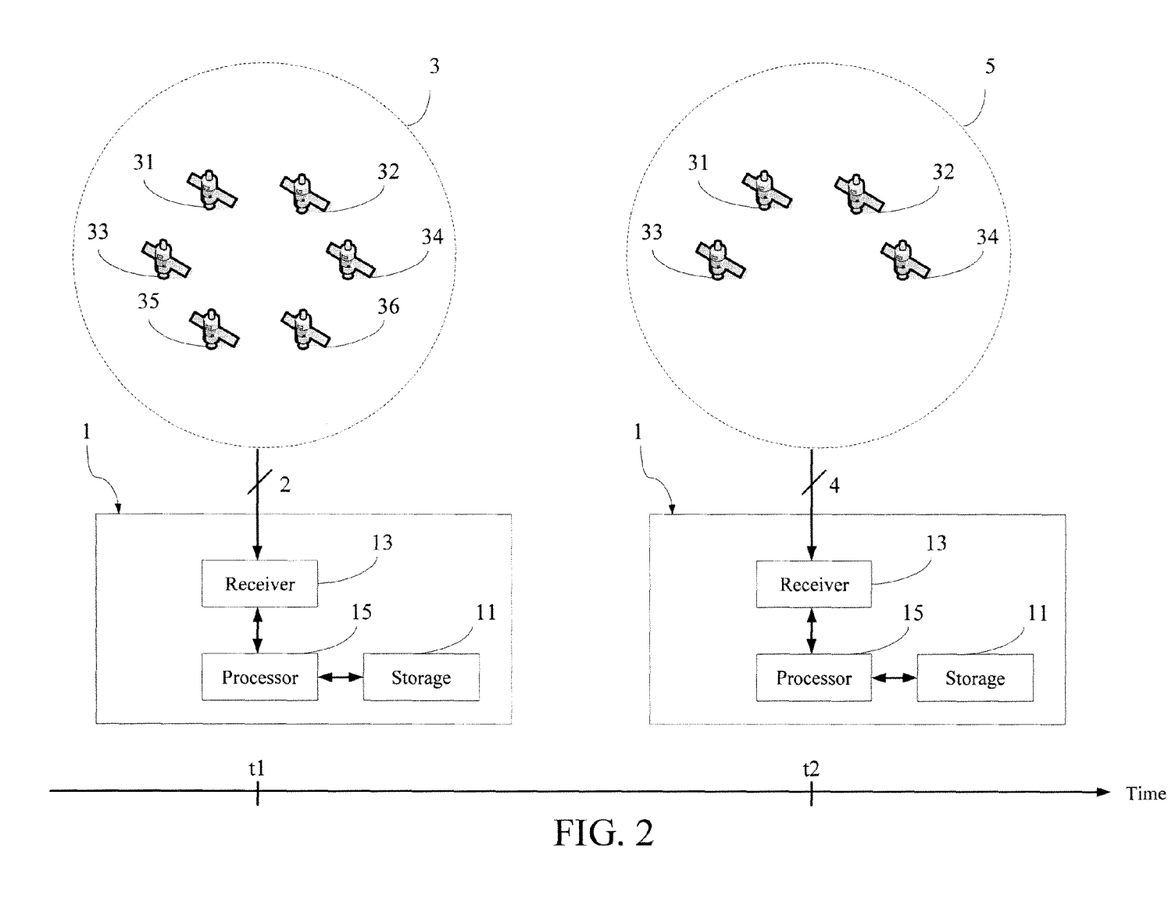
FIG. 2 is a schematic view illustrating operations of a positioning device 1 according to a second embodiment of the present invention.

Referring to FIG. 2, a second embodiment of the present invention is a positioning device 1. FIG. 2 is another schematic view illustrating operations of the positioning device 1. The second embodiment differs from the first embodiment mainly in that, a satellite amount of the first satellite group 3 is larger than a satellite amount of the second satellite group 5. The first satellite group 3 comprises a satellite 31, a satellite 32, a satellite 33, a satellite 34, a satellite 35 and a satellite 36, and the second satellite group 5 comprises a satellite 31, a satellite 32, a satellite 33 and a satellite 34. It shall be appreciated that, the satellite amount of the first satellite group 3 and that of the second satellite group 5 described herein are only illustrated as an example of the present invention but are not merely limited thereto.

In this embodiment, the receiver 13 receives a first satellite group signal 2 from the first satellite group 3 at a first time point t1, and receives a second satellite group signal 4 from the second satellite group 5 at a second time point t2. The processor 15, which is electrically connected to the storage 11 and the receiver 13, is configured to calculate a positioning offset value according to the first satellite group signal 2, calculate a positioning result according to the second satellite group signal 4 and the positioning offset value, and stores the positioning result in the storage 11.

As described in the first embodiment, the so-called "positioning offset value" means a value obtained by multiplying residual values of some satellites with a relational matrix. Similarly, in the second embodiment, assume that a set of visible satellite serial numbers at a time point is P, a set of visible satellite serial numbers at a time point t2 is Q, and a set of columns in the channel matrix $H_P$ that correspond to the lost satellites at the time point t2. Then, the positioning offset value of the positioning device 1 caused by the reduced satellite amount may be rewritten as the following general expression:

$$\delta_x = -AH_2^T(\Delta\rho_P - H_1 \Delta x_P)$$

$$A = (H_1^T H_1)^{-1} H_1^T H_2 B$$

$$B = [H_2^T H_2 - H_2^T H_1 (H_1^T H_1)^{-1} H_1^T H_2]^{-1} \tag{12}$$

where, $\Delta x_P$ represents a positioning result of the first satellite group 3, $H_1$ represents a channel matrix $H_{P \times 4}$ of the first satellite group 3, and $H_2$, represents another channel matrix $H_{P \times (P-Q)}$ of the first satellite group 3. Here, in $H_{P \times (P-Q)}$, the $G\{i\}^{th}$ element in the $i^{th}$ row has a value of 1 and other elements all have a value of 0. Additionally, the processor 17 may also diminish the positioning offset value $\delta_x$ caused by the reduced satellite amount depending on the parameter k.

With the arrangement and operations of the second embodiment, the positioning device 1 of the present invention can calculate a positioning offset value simply according to the first satellite group signal 2 when the satellite amount decreases, and the positioning offset value diminishes with time depending on the parameter k; further, the second satellite group signal 4 and the positioning offset value can be used to derive a positioning result, which is just the coordinates of the positioning device 1 in which the satellite offset value has been canceled.

Figure 3:
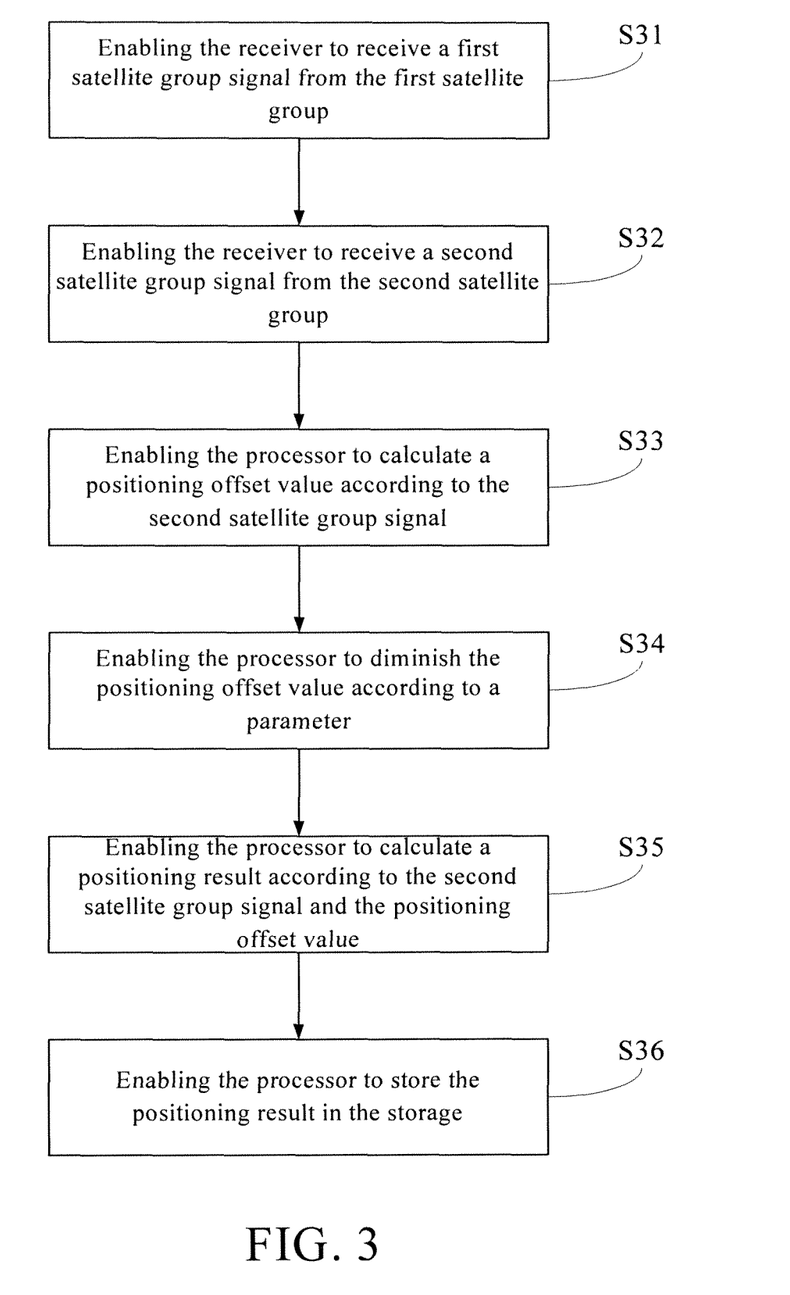
FIG. 3 is a flowchart of a third embodiment of the present invention.

A third embodiment of the present invention is a positioning method for use in a positioning device. FIG. 3 is a flowchart of the third embodiment. It shall be noted that, the positioning device is capable of cooperating with a first satellite group and a second satellite group, and a satellite amount of the first satellite group is smaller than a satellite amount of the second satellite group. The positioning device comprises a storage, a receiver, and a processor electrically connected to the storage and the receiver. In other words, the positioning device is the positioning device 1 of the first embodiment, and the first satellite group and the second satellite group are the first satellite group 3 and the second satellite group 5 of the first embodiment respectively.

In addition, the positioning method of the third embodiment may be embodied in a computer program product. When the computer program product is loaded in the positioning device and a plurality of codes contained therein is executed, the positioning method of the third embodiment will be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

As shown in FIG. 3, step S31 is executed to enable the receiver to receive a first satellite group signal from the first satellite group at a first time point t1. Step S32 is then executed to enable the receiver to receive a second satellite group signal from the second satellite group at a second time point t2. Step S33 is executed to enable the processor to calculate a positioning offset value according to the second satellite group signal. As described in the first embodiment, the so-called "positioning offset value" means a value obtained by multiplying residual values of some satellites with a relational matrix, and in this embodiment, the positioning offset value is related to the second satellite group signal; therefore, the processor can calculate the positioning offset value simply by processing the second satellite group signal.

Next, step S34 is executed to enable the processor to diminish the positioning offset value according to a parameter. In respect of the meaning of the parameter and how to diminish the positioning offset value according to the parameter, reference may be made to the first embodiment and Equation (11) and no further description will be made herein. Thereafter, step S35 is executed to enable the processor to calculate a positioning result according to the second satellite group signal and the positioning offset value, and step S36 is executed to enable the processor to store the positioning result in the storage. Here, the positioning result is just coordinates of the positioning device in which the satellite offset value has been eliminated.

It shall be appreciated that, in other embodiments of the present invention, the step S34 may be omitted in the positioning method; i.e., the positioning offset value that is derived will not diminish with time.

In addition to the aforesaid steps, the third embodiment can also execute all the operations and functions set forth in the first embodiment. How the third embodiment executes these operations and functions will be readily appreciated by those of ordinary skill in the art based on the explanation of the first embodiment, and thus will not be further described herein.

Figure 4:
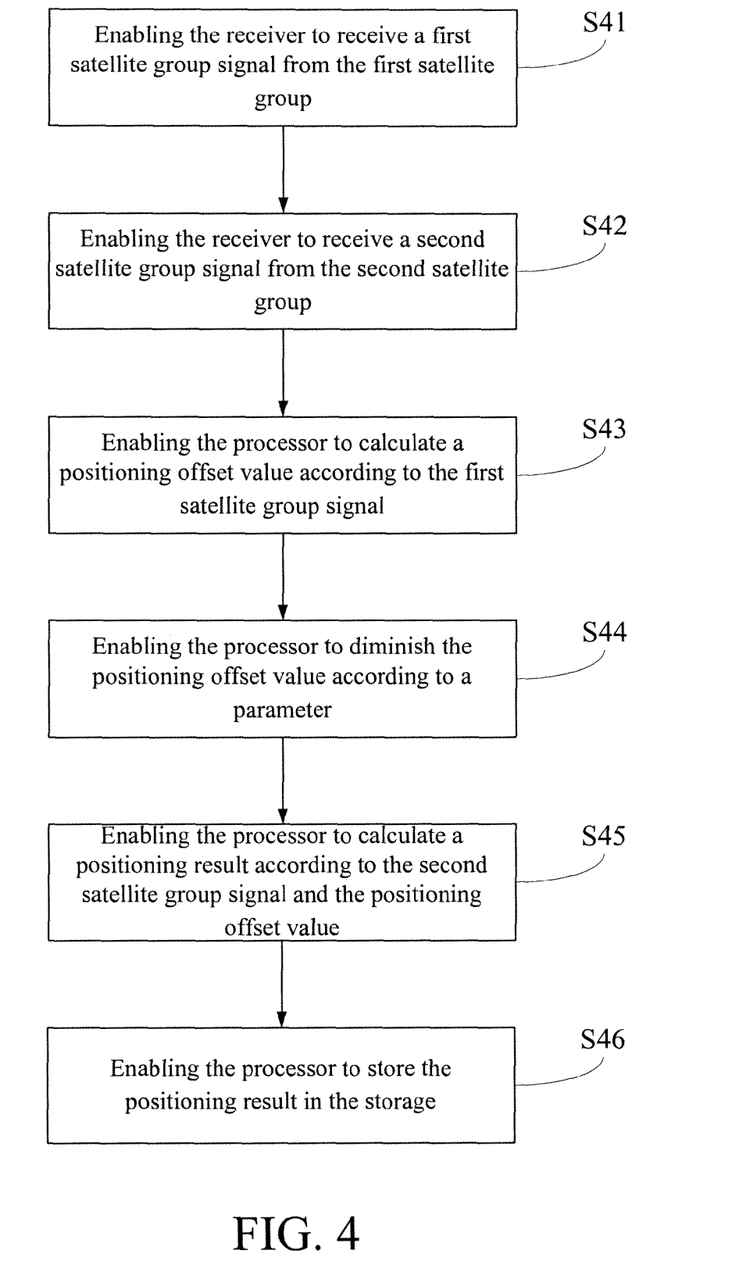
FIG. 4 is a flowchart of a fourth embodiment of the present invention.

A fourth embodiment of the present invention is also a positioning method for use in a positioning device. FIG. 4 is a flowchart of the fourth embodiment. It shall be noted that, the positioning device is capable of cooperating with a first satellite group and a second satellite group, and a satellite amount of the first satellite group is larger than a satellite amount of the second satellite group. The positioning device comprises a storage, a receiver, and a processor electrically connected to the storage and the receiver. In other words, the positioning device is the positioning device 1 of the second embodiment, and the first satellite group and the second satellite group are the first satellite group 3 and the second satellite group 5 of the second embodiment respectively.

In addition, the positioning method of the fourth embodiment may be embodied in a computer program product. When the computer program product is loaded in the positioning device and a plurality of codes contained therein is executed, the positioning method of the fourth embodiment will be accomplished. This computer program product may be stored in a tangible machine-readable medium, such as an ROM, a flash memory, a floppy disk, a hard disk, a compact disk, a mobile disk, a magnetic tape, a database accessible to networks, or any other storage media with the same function and well known to those skilled in the art.

As shown in FIG. 4, step S41 is executed to enable the receiver to receive a first satellite group signal from the first satellite group at a first time point t1. Then, step S42 is executed to enable the receiver to receive a second satellite group signal from the second satellite group at a second time point t2. Step S43 is executed to enable the processor to calculate a positioning offset value according to the first satellite group signal. Further speaking, as described in the first embodiment, the so-called "positioning offset value" means a value obtained by multiplying residual values of some satellites with a relational matrix, and in this embodiment, the positioning offset value is related to the first satellite group signal; therefore, the processor can calculate the positioning offset value simply by processing the first satellite group signal.

Step S44 is then executed to enable the processor to diminish the positioning offset value according to a parameter. In respect of the meaning of the parameter and how to diminish the positioning offset value according to the parameter, reference may be made to the first embodiment and Equation (11) and no further description will be made herein. Thereafter, step S45 is executed to enable the processor to calculate a positioning result according to the second satellite group signal and the positioning offset value, and step S46 is executed to enable the processor to store the positioning result in the storage. Here, the positioning result is just coordinates of the positioning device in which the satellite offset value has been eliminated. It shall be appreciated that, in other embodiments of the present invention, the step S44 may be omitted in the positioning method; i.e., the positioning offset value that is derived will not diminish with time.

In addition to the aforesaid steps, the fourth embodiment can also execute all the operations and functions set forth in the second embodiment. How the fourth embodiment executes these operations and functions will be readily appreciated by those of ordinary skill in the art based on the explanation of the second embodiment, and thus will not be further described herein.

According to the above descriptions, in response to a satellite amount of a first satellite group and a satellite amount of a second satellite group, the positioning device and the positioning method thereof of the present invention calculate a positioning offset value according to one of a first satellite group signal and a second satellite group signal, and then calculate a positioning result according to the second satellite group signal and the positioning offset value.

In particular, because the first satellite group signal and the second satellite group signal are just positioning signals received by conventional GPS devices in normal operations, it is unnecessary for the positioning device and the positioning method thereof of the present invention to calculate positioning solutions of satellite configurations before and after a change occurs in the satellite amount; instead, the positioning offset value can be calculated simply according to the known positioning signals. Accordingly, the positioning device and the positioning method thereof of the present invention can effectively solve the problem of instantaneous positioning coordinate offset of conventional GPS devices caused by a change in the satellite amount.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A positioning device, cooperating with a first satellite group and a second satellite group, one of the first satellite group and the second satellite group comprising a plurality of first satellites and the other comprising a plurality of second satellites which includes the first satellites and at least one new satellite, the positioning device comprising:
   a storage;
   a receiver, being configured to receive a first satellite group signal from the first satellite group at a first time point and receive a second satellite group signal from the second satellite group at a second time point after the first time point; and
   a processor electrically connected to the storage and the receiver, being configured to calculate a first positioning result according to the second satellites, calculate residual values of the second satellites according to the first positioning result, a channel matrix of the second satellites and a distance matrix between the positioning device and the second satellites, calculate a positioning offset value according to the residual values of the second satellites and a relational matrix, calculate a second positioning result according to the second satellite group signal and the offset value, and store the second positioning result in the storage;
   wherein the relational matrix comprising a specific channel matrix calculated by the processor according to the channel matrix of the second satellites.

2. The positioning device as claimed in claim 1, wherein the processor calculates a positioning offset relationship between the first satellite group signal and the second satellite group signal according to a least-squares algorithm, and calculates the positioning offset value according to the positioning offset relationship, the residual values of the second satellites and the relational matrix.

3. The positioning device as claimed in claim 1, wherein the processor further diminishes the positioning offset value according to a weight parameter.

4. A positioning method for use in a positioning device, the positioning device cooperating with a first satellite group and a second satellite group, one of the first satellite group and the second satellite group comprising a plurality of first satellites and the other comprising a plurality of second satellites which includes the first satellites and at least one new satellite, the positioning method comprising the steps of:
   (a) enabling the receiver to receive a first satellite group signal from the first satellite group at a first time point;
   (b) enabling the receiver to receive a second satellite group signal from the second satellite group at a second time point after the first time point;
   (b1) enabling the processor to calculate a first positioning result according to the second satellites;
   (b2) enabling the processor to calculate residual values of the second satellites according to the first positioning result, a channel matrix of the second satellites and a distance matrix between the positioning device and the second satellites;
   (c) enabling the processor to calculate a positioning offset value according to the residual values of the second satellites and a relational matrix, wherein the relational matrix comprising a specific channel matrix calculated by the processor according to the channel matrix of the second satellites;
   (d) enabling the processor to calculate a second positioning result according to the second satellite group signal and the offset value; and
   (e) enabling the processor to store the second positioning result in the storage.

5. The positioning method as claimed in claim 4, wherein the step (c) further comprises the steps of:
   (c1) enabling the processor to calculate a positioning offset relationship between the first satellite group signal and the second satellite group signal according to a least-squares algorithm; and
   (c2) enabling the processor to calculate the positioning offset value according to the positioning offset relationship, the residual values of the second satellites and the relational matrix.

6. The positioning method as claimed in claim 4, further comprises the steps of:
   enabling the processor to diminish the positioning offset value according to a weight parameter.

* * * * *